United States Patent [19]

Baumgardner et al.

[11] Patent Number: 4,639,200

[45] Date of Patent: Jan. 27, 1987

[54] SEALING APPARATUS FOR A GEAR BALL JOINT

[75] Inventors: Terry A. Baumgardner, Springfield; Jere L. Krouse, Urbana; Alan G. Wild, Woodstock, all of Ohio

[73] Assignee: Robbins & Myers, Inc., Springfield, Ohio

[21] Appl. No.: 732,119

[22] Filed: May 9, 1985

[51] Int. Cl.⁴ .................. F04C 18/22; F16J 15/32; F16D 3/16
[52] U.S. Cl. .................. 418/48; 277/212 FB; 464/159; 464/173
[58] Field of Search .................. 418/48, 182; 464/16, 464/133, 158, 159, 173; 277/212 R, 212 C, 212 F, 212 FB

[56] References Cited

U.S. PATENT DOCUMENTS

| | | | |
|---|---|---|---|
| 3,164,389 | 1/1965 | Thomas | 277/212 FB |
| 3,582,091 | 6/1971 | Smith | 277/212 FB |
| 4,003,667 | 1/1977 | Gaines | 277/212 FB |
| 4,305,596 | 12/1981 | Unterstrasser | 277/212 FB |
| 4,456,269 | 6/1984 | Krude | 277/212 FB |

*Primary Examiner*—Carlton R. Croyle
*Assistant Examiner*—Jane E. Obee
*Attorney, Agent, or Firm*—Biebel, French & Nauman

[57] ABSTRACT

A seal for a gear ball joint in a progressing cavity pump. The seal includes a flexible seal member having a depending flange portion including five sealing surfaces for sealing against mating parts of the joint assembly. The seal also includes an annular stiffening wire molded within the flange portion to provide dimensional stability during seal molding, structural support during assembly and increased working life.

5 Claims, 12 Drawing Figures

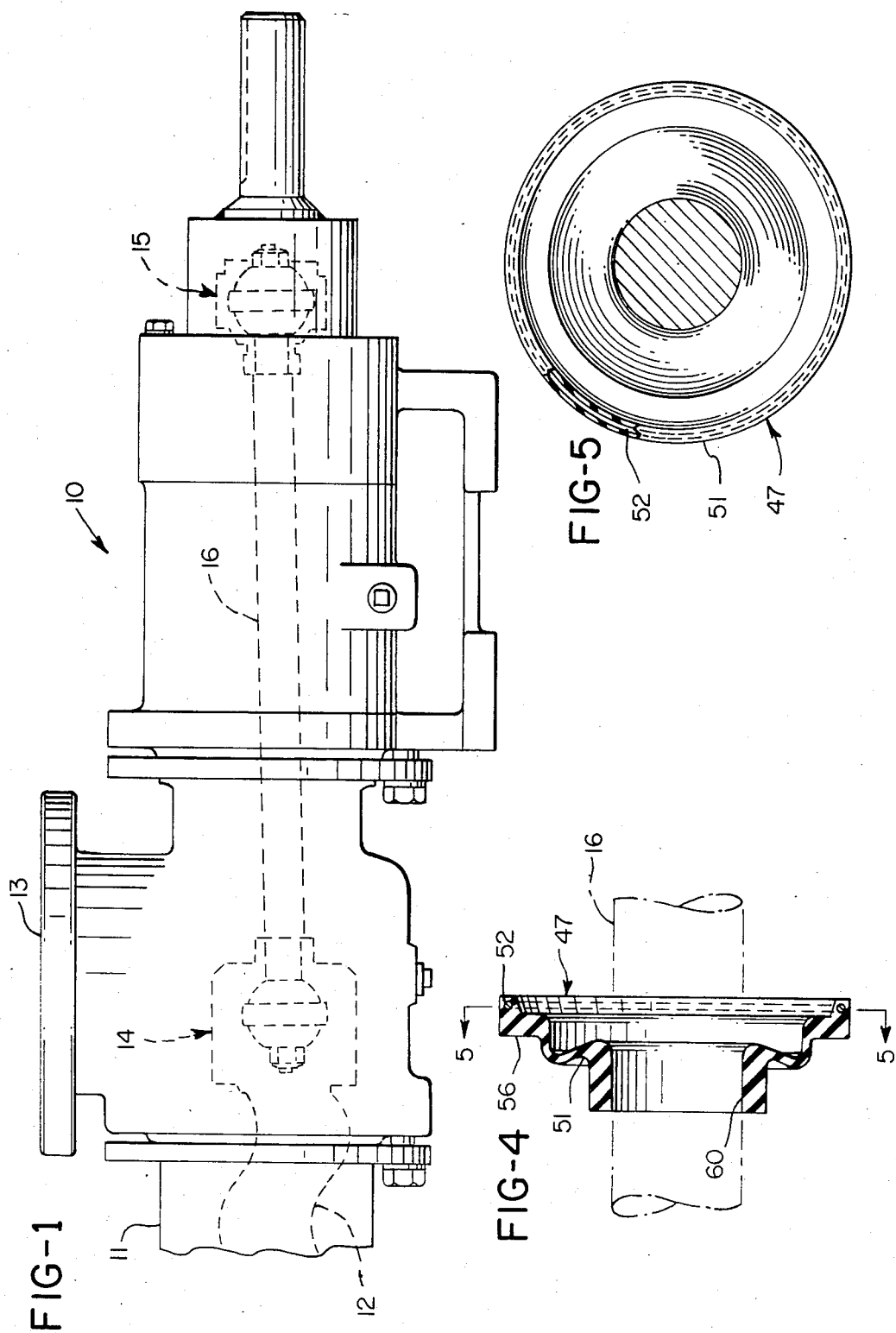

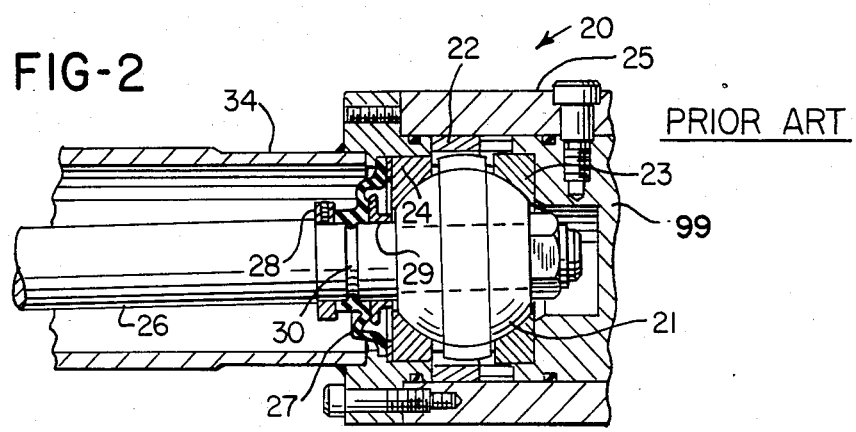
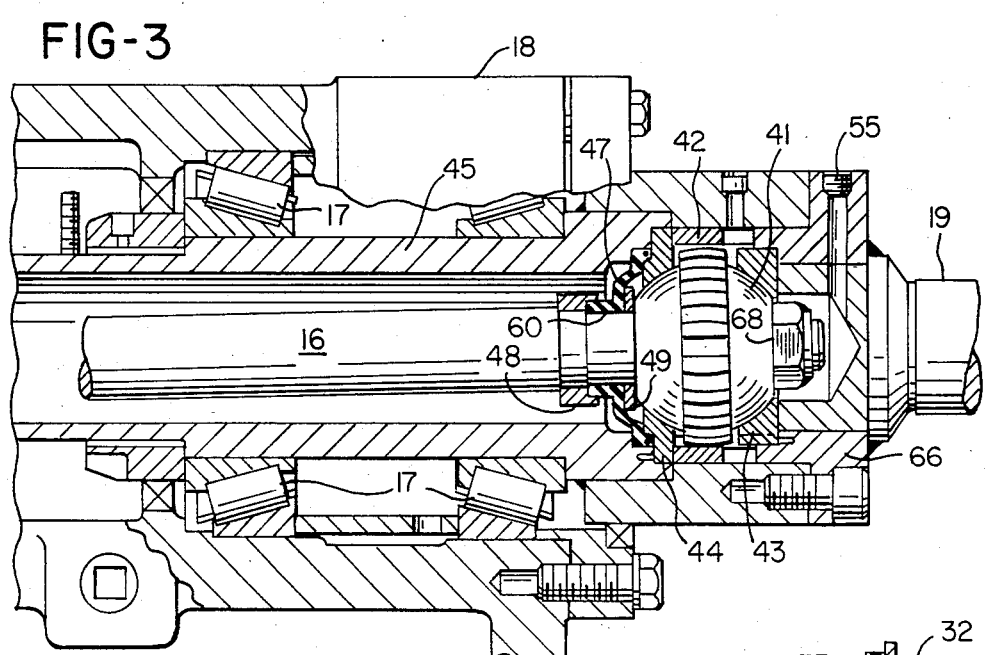
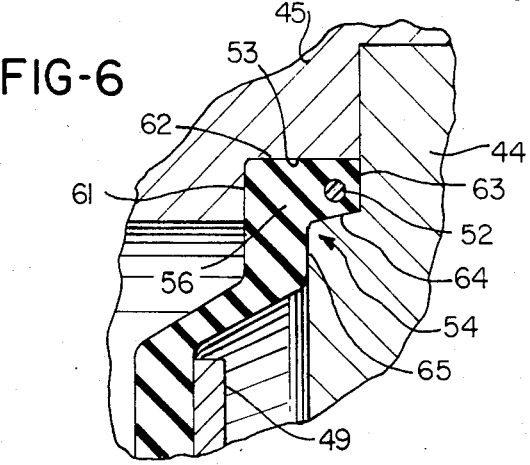
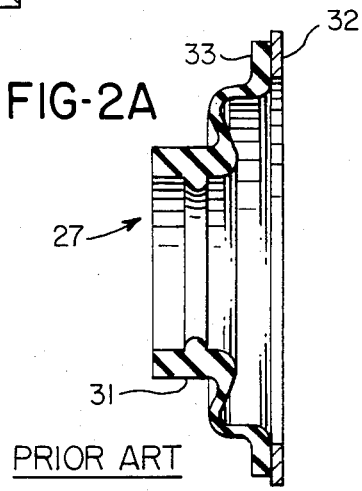

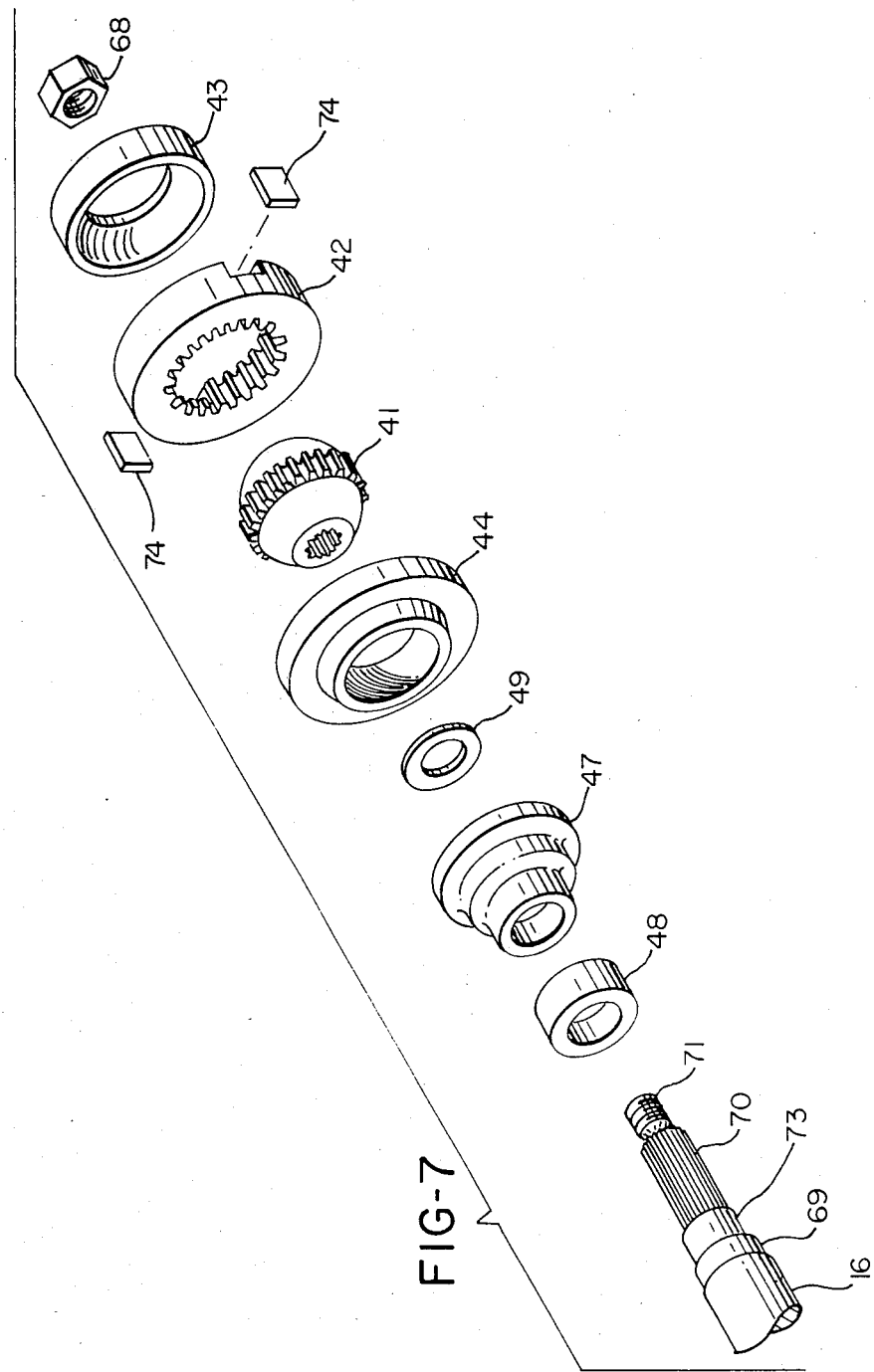

SEALING APPARATUS FOR A GEAR BALL JOINT

BACKGROUND OF THE INVENTION

This invention relates to gear ball joints and particularly to gear ball joints utilized in driving mechanisms for progressing cavity pumps. Such pumps comprise a partially elastic stator having a helical cavity and a helical rotor having one less helical turn than the stator. For general background information regarding the design of such pumps reference may be made to Moineau U.S. Pat. No. 2,028,407.

Modern versions of such pumps are oftentimes driven by suitable driving means connected to the rotor by a pair of gear ball joints as generally illustrated in FIG. 1 of the appended drawing. Such gear ball joints are particularly well adapted to cope with the complex rotary motion of the end of the rotor. As illustrated in FIG. 1, a progressing cavity pump 10 may comprise a stator 11 and a rotor 12 and suitable inlet means 13 for providing a viscous fluid to the pumping cavity. Rotary driving motion is transmitted to rotor 12 by a first gear ball joint 14 driven by a connecting rod 16 and a second gear ball joint 15.

In progressing cavity pumps of the type illustrated in FIG. 1 it is necessary to provide fluid seals for gear ball joints 14 and 15. Sealing devices applied to such use are subject to considerable wear and are prone to failure from time to time. Typical prior art sealing means as applied to second gear ball joint 15 are illustrated in FIGS. 2 and 2A of the drawings.

As illustrated in FIG. 2 a prior art gear ball joint comprises a gear ball 21 driven by a ring gear 22 and supported on a connecting rod 26 by a primary thrust plate 23 and a secondary thrust plate 24. The ring gear 22 is keyed to a drive shaft 99. Drive shaft 99 drives the ring gear 22 and also a shaft connector 25, which in turn drives an annular shaft 32 surrounding connecting rod 26. During normal use of the pump a working fluid (not illustrated) fills the space within annular shaft 34. This fluid is prevented from seeping into the gear ball joint by means of a seal 27 seated on connecting rod 26 between a retainer 28 and a seal support 29. Connecting rod 26 is provided with a surface groove 30 for receiving a mating projection on seal 27.

As illustrated in FIG. 2A the prior art seal 27 comprises a flexible seal member 31 bonded to a metal washer 32. Washer 32 is provided for the purpose of supporting the seal member 31 during the assembly process. This design has a problem in that it has metal-to-metal sealing surfaces and is susceptible to failure of the rubber-to-metal bond. Furthermore, the exterior portion of the seal has only a single rather limited sealing surface as designated by the reference numeral 33. This seal is prone to leakage during use, so that the pump must be disassembled from time to time for seal replacement.

It is therefore seen that there is a need for a seal for a gear ball joint having improved sealing properties and extended life.

SUMMARY OF THE INVENTION

It is an object of the present invention to provide improved sealing means for a gear ball joint in a progressing cavity pump. This is accomplished by providing a recess in the interior surface of the annular shaft surrounding the connecting rod and a step on the facing surface of the secondary thrust plate. A flexible seal is mounted sealingly around the connecting rod and extends outwardly into the space between the aforementioned step and recess.

It is another object of the invention to provide a flexible seal for a gear ball joint. As applied to the herein described progressing cavity pump, the flexible seal has a molded flange portion provided with five sealing surfaces for sealing engagement with mating portions of the connecting rod and the thrust plate. A stiff support wire is molded interiorly within the flange portion of the seal member to provide required support during the assembly process. The support wire also provides support during operation and enhances the life of the seal. The stiffening wire provides an additional benefit in that it contributes to dimensional stability during the molding and curing process which are essential to the fabrication of the seal.

Other and further objects and advantages of the present invention will be apparent from the following description, the accompanying drawings, and the appended claims.

BRIEF DESCRIPTION OF THE DRAWINGS

FIG. 1 is a side elevation illustration of the driving end of a progressing cavity pump.

FIG. 2 is a cross sectional drawing of a gear ball joint sealed in accordance with the prior art.

FIG. 2A is a cross sectional drawing of a prior art seal.

FIG. 3 is a partially cross sectioned side elevation drawing of a gear ball joint sealed in accordance with the present invention.

FIG. 4 is a cross sectional drawing of a seal shown in side elevation.

FIG. 5 is an end elevation drawing of a seal.

FIG. 6 is an enlarged view of a portion of FIG. 3.

FIG. 7 is an exploded perspective view of components for a gear ball joint.

DESCRIPTION OF THE PREFERRED EMBODIMENT

Figure 8B:
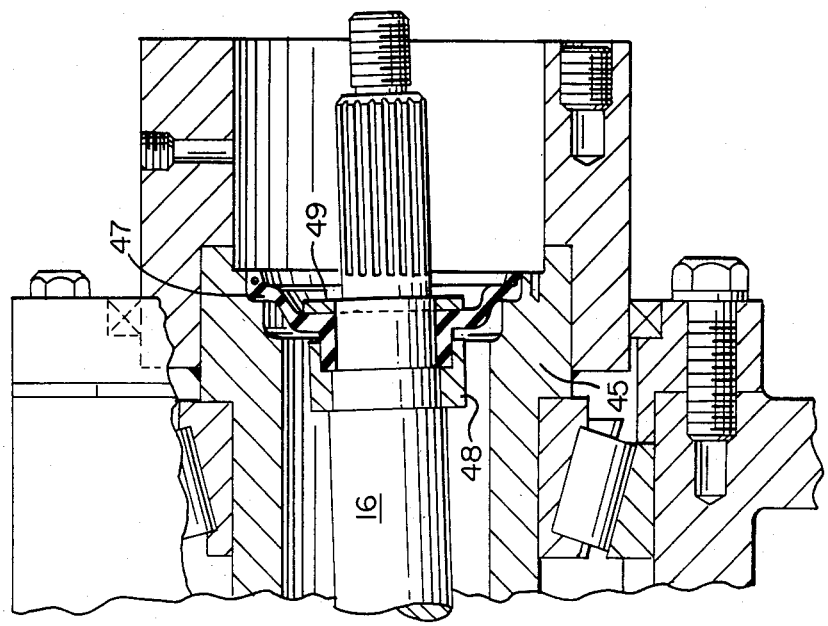
FIGS. 8A-8D are illustrations of four successive steps in the assembly of a gear ball joint.

The general environment for a gear ball joint seal is illustrated in FIG. 1, as described above. FIG. 3 provides a detailed illustration of a joint according to the present invention which may include a gear ball 41 mounted on connecting rod 16. A shaft 19 connected to a suitable motor (not illustrated) provides driving power to an end plate 66 which is connected to an annular drive shaft 45 enclosing connecting rod 16. End plate 66 and drive shaft 45 are supported by a set of bearings 17 carried by drive shaft housing 18. Driving power for connecting rod 16 is provided by end plate 66 acting through drive shaft 45 (illustrated as an assembly of two elements), a pair of keys 74, 74 (FIG. 7), a ring gear 42 and gear ball 41. Gear ball 41 is secured on connecting rod 16 by a nut 68 and is supported by a primary thrust plate 43 and a secondary thrust plate 44. End plate 66 is provided with a vent opening 55.

The sealing means of the present invention comprises a seal 47 as illustrated in detail in FIGS. 4 and 5. Seal 47 is retained on connecting rod 16 by a retainer 48 and is supported by a seal support 49.

Referring now to FIGS. 4 and 5, seal 47 may be observed to comprise a flexible seal member 51 having a depending flange portion 56. A stiff ring 52 is molded interiorly within flange portion 56 as best illustrated in FIG. 6. Seal member 51 has a smooth inner surface 60 for making a seal against the surface of connecting rod 16.

Ring 52 is preferably fabricated from high tensile strength spring wire. However, low carbon steel wire or other rigid, durable material is also suitable. The ring may be bonded to the seal member 51 by a suitable adhesive, but this is not necessary, since the ring is completely encapsulated by the seal member. Seal member 51 is preferably molded from Buna "N" a commercially available nitrile rubber but other flexible materials may be used.

The details of the seal will now be described with reference to FIG. 6. As therein illustrated, drive shaft 45 is provided with a circumferentially extending recess 53 on its interior surface surrounding connecting rod 16 and facing secondary thrust plate 44. Secondary thrust plate 44 is provided with an inwardly bevelled and circumferentially extending step 54 in opposed relation to recess 53 to define a gap therebetween. Flange 56 is configured to fit into that gap and provide sealing along five sealing surfaces 61-65.

The first sealing surface 61 extends circumferentially and radially and faces rearwardly for contact against a mating surface of drive shaft 45. Second sealing surface 62 joins first sealing surface 61, extends circumferentially and axially and faces outwardly to contact a second mating surface of drive shaft 45. Third sealing surface 63 faces forwardly for sealing contact against secondary thrust plate 44 and extends radially inward from second sealing surface 62, in parallel relation to first sealing surface 61. The fourth sealing surface 64 extends rearwardly and inwardly from third sealing surface 63. The inward slope of surface 64 is preferably about 15 degrees. This angle enhances the assembly process and contributes to a positive seal. Fifth sealing surface 65 extends radially inward from fourth sealing surface 64 in spaced relation between first sealing surface 61 and third sealing surface 63.

Stiffening wire 52 is preferably molded into flange 56 at a location rearwardly of third sealing surface 63 and forward of the plane of fifth sealing surface 65. In a typical embodiment stiffening wire 52 may have a nominal diameter of about 2.77 inches and a cross sectional diameter of about 0.035 inches. The axial distance between first sealing surface 61 and third sealing surface 63 may be about 0.26 inches, while the axial distance between third sealing surface 63 and the plane of fifth sealing surface 65 may be about 0.11 inches. The axial extent of third sealing surface 63 may be about 0.12 inches.

FIG. 7 provides a guide to the assembly of a gear ball joint in accordance with this invention. As shown in that figure, connecting rod 16 may have a first turned diameter 69, a second turned diameter 73, a splined portion 70 and a threaded portion 71. Retainer 48 fits over first turned diameter 69 while seal 47 fits over second turned diameter 73 partially underlying retainer 48. Seal support 49 fits just inboard of spline portion 70 against the forward surface of seal 47. Gear ball 41 is splined to fit over splined portion 70 of connecting rod 16, and thrust plate 44, ring gear 42 and thrust plate 43 all fit around gear ball 41. A pair of keys 74, 74 are provided for locking ring gear 42 against rotation within drive shaft 45. Keys 74, 74 fit into keyways on ring gear 42 and end plate 66. Nut 68 is threaded upon the threaded surface 71. End plate 66 (FIG. 3) is bolted against drive shaft 25 to secure the assembly in place. The assembly process is illustrated in detail in FIGS. 8A-8D.

Figure 8A:
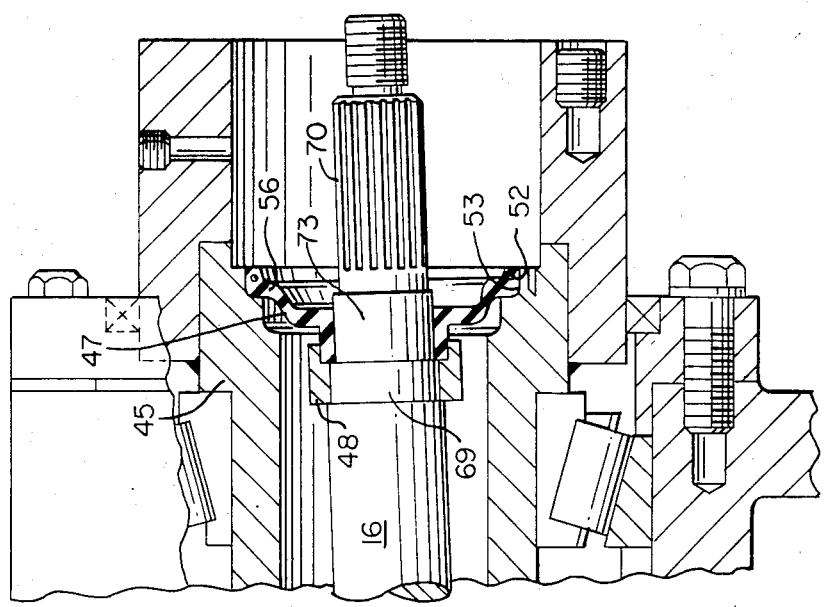

FIG. 8A illustrates an early stage in the assembly process after retainer 48 has been fitted onto turned diameter 69 of connecting rod 16 and seal 47 has been fitted thereunder. It will be seen that seal 47 rests sealingly against the surface of turned diameter 73. Flange portion 56 of seal 47 is fitted snugly into recess 53 of drive shaft 45. At this time the weight of connecting rod 16 is supported by seal 47. It will be appreciated that flexible seal member 51 is not sufficiently rigid for carrying such weight and that the weight supporting function is performed primarily by ring 52. An increasingly severe stress is placed upon ring 52 as the assembly proceeds.

FIG. 8B illustrates the next step in the assembly process after seal support 49 has been slipped into place against seal 47. Thereafter secondary thrust plate 44 is placed in position, as illustrated by FIG. 8C, with step 54 positioned sealingly against the inside surface of flange 56 of seal 47. After this step is completed, seal 47 is completely obscured from view. If seal 47 should thereafter slip out of position, the slippage most likely will escape detection. Consequently the joint will not be properly sealed, and catastrophic failure can be expected after a very short period of usage.

Figure 8D:
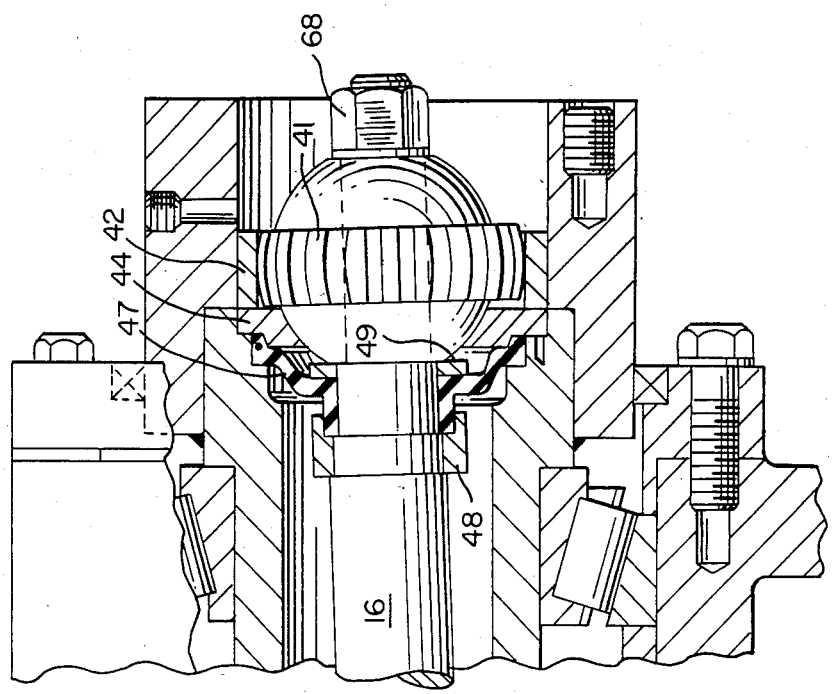
Figure 8C:
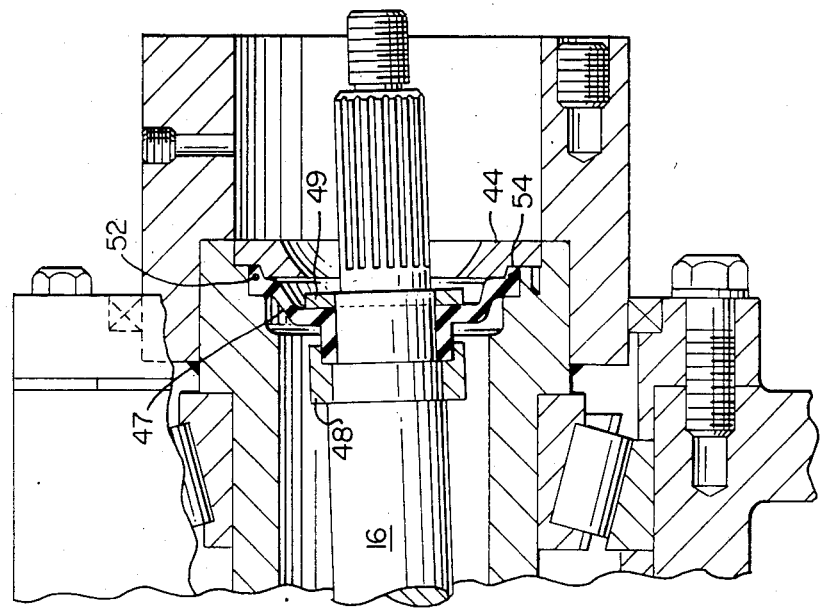

FIG. 8D illustrates a further point in the assembly process after ring gear 42 has been fitted into place and gear ball 41 has been secured on connecting rod 16 by nut 68. Thereafter first thrust plate 43 is positioned against the surface of gear ball 41 and end plate 66 is bolted into place. The finished assembly appears as illustrated in FIG. 3.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a progressing cavity pump comprising a stator, a helical rotor mounted within said stator, a connecting rod connected to said rotor by means of a first gear ball joint, an annular drive shaft surrounding said connecting rod and connected thereto by a second gear ball joint comprising a gear ball mounted on said connecting rod, a ring gear for driving said gear ball, a primary thrust plate for supporting said gear ball on the surface thereof which is remote from said first ball joint, and a secondary thrust plate for supporting said gear ball on the surface thereof which faces said first ball joint; improved sealing means comprising:

a circumferentially extending recess in the interior surface of said drive shaft, said recess surrounding said connecting rod and facing said secondary thrust plate, a circumferentially extending step on said secondary thrust plate spaced apart from and opposing said recess, a flexible seal mounted sealingly around said connecting rod and sealingly between said step and said recess, and a stiff support wire molded interiorly within said flexible seal member in that portion thereof which is positioned between said recess and said step.

2. Apparatus according to claim 1 wherein said sealing means further comprises:

an annular retainer for retaining said flexible seal against said connecting rod, and a seal support for supporting said flexible seal against said retainer.

3. Apparatus according to claim 2 wherein said step is inwardly bevelled.

4. A seal for a gear ball joint comprising:

a flexible and generally annular rod-gripping portion interiorly provided with a circumferentially and axially extending inner surface for making a seal against the surface of a cylindrical connecting rod, a flexible and generally annular flange portion depending from said rod-gripping portion, and an annular stiffening wire molded within said flange portion; said flange portion being provided with:

a rearwardly facing first sealing surface extending circumferentially and radially, a second sealing surface joined to said first sealing surface, extending circumferentially and axially and facing outwardly, a forwardly facing third sealing surface extending radially inward from said second sealing surface, in parallel relation to first sealing surface, a fourth sealing surface extending rearwardly and inwardly from said third sealing surface, and a fifth sealing surface extending radially inward from said fourth sealing surface in spaced parallel relation between said first sealing surface and said third sealing surface.

5. A seal according to claim 4 wherein said stiffening wire is molded radially between said second sealing surface and said fourth sealing surface at an axial location rearward of said third sealing surface and forward of the plane of said fifth sealing surface.

* * * * *